United States Patent
Zhao

(10) Patent No.: US 7,124,295 B1
(45) Date of Patent: Oct. 17, 2006

(54) DELTA CRL ENHANCEMENT

(75) Inventor: Michelle Zhao, San Jose, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 849 days.

(21) Appl. No.: 09/902,253

(22) Filed: Jul. 9, 2001

(51) Int. Cl.
*H04L 9/00* (2006.01)

(52) U.S. Cl. ...................... 713/158; 713/156

(58) Field of Classification Search .......... 713/158, 713/155, 156
See application file for complete search history.

(56) References Cited

U.S. PATENT DOCUMENTS 5,687,235 A * 11/1997 Perlman et al. ............. 713/158
6,128,740 A * 10/2000 Curry et al. ................ 713/200
6,442,688 B1 * 8/2002 Moses et al. ............... 713/158

OTHER PUBLICATIONS

Webster's Third New International Dictionary, G & C Merriam Company, 1967, pp. 2072-2073.*
Microsoft Computer Dictionary, Microsoft Press, 2002, p. 473.*
ITU-T Recommendation X.509—ISO / IEC 9594-8, 1997.*

* cited by examiner

*Primary Examiner*—Gilberto Barrón, Jr.
*Assistant Examiner*—Kristin Derwich
(74) *Attorney, Agent, or Firm*—Osha Liang LLP

(57) ABSTRACT

A method and apparatus for producing an enhanced CRL. In response to a request containing an identifier of the most recently owned CRL stored by the requested, a certificate authority generates a CRL spanning from the most recently owned CRL to the current CRL. This CRL is formatted as a delta CRL and transmitted as a reply to the requester. This has the advantage of not requiring transmission of the full CRL even though more than one generation of CRL has occurred since the most recently owned CRL by the requester.

14 Claims, 8 Drawing Sheets

DELTA CRL ENHANCEMENT

FIELD OF THE INVENTION

This invention relates generally to the field of digital certificates and certificate revocation lists (CRL). More particularly, this invention relates to creation of a delta CRL that spans changes over more than two CRLs.

BACKGROUND OF THE INVENTION

Digital certificates are in wide use on the Internet and in the field of electronic commerce for authentication of all sorts of electronic transactions. In general, such digital certificates are used to certify the identity of an entity in the digital world, particularly as defined by the public key infrastructure (PKI). As digital certificates are issued and used, they often are either revoked or expire after a predetermined amount of time. In other situations, a digital certificate may be revoked or placed on hold pending some event. In order for digital certificates to be useful, it is important that those entities using digital certificates to authenticate the identity of an entity presenting the digital certificate have confidence that the digital certificate is valid. Generally, the validity of a digital certificate can be determined by reference to a Certificate Revocation List (CRL) produced by an authority that generates the certificates (usually a Certificate Authority).

FIG. 1 depicts a simple exemplary computer network 100 that utilizes a digital certificate and a Certificate Revocation List. In system 100, a user terminal 104 may request via a network (for example the Internet) 108, a digital certificate from a Certificate Authority 112. The Certificate Authority 112 generates and issues the certificate, which is returned to the user terminal 104. The user terminal 104 can then utilize the digital certificate to carry out the transaction with another entity such as remote server 116. Such transactions may include financial transactions or any other transaction in which the identity of the user terminal 104 should be reliably authenticated.

When user terminal 104 sends the digital certificate to remote server 116, the remote server 116 can inspect the digital certificate against a list of revoked certificates (the Certificate Revocation List) stored by the remote server 116. In the event remote server 116 has not obtained a recent CRL, one can be requested from the Certificate Authority 112. Certificate Authority 112 then either generates a new CRL or sends the most recently generated CRL to the remote server 116. Remote server 116 can then determine whether nor not the digital certificate sent by user terminal 104 is valid. Thus, remote server 116 can authenticate the user terminal 104 and determine whether or not to authorize particular transaction at hand.

FIG. 2 depicts a message flow diagram 200 for the transaction just described. In this message flow diagram, a certificate request 204 is sent from the user terminal 104 to the Certificate Authority 112. The Certificate Authority 112 generates a certificate at 208 and returns the certificate at 212 to the user terminal 104. The user terminal 104 can then submit a transaction using the certificate at 218 to the remote server 116. Remote server 116 can then request a new CRL at 222 of the Certificate Authority. The Certificate Authority 112 then generates or retrieves a CRL at 226 and sends the CRL to the remote server 116 at 230. Depending on the nature of the transaction, the remote server 116 may process the CRL at 232 by taking various actions including, for example, sorting, filtering or reformatting the CRL and storing information in its own database. At 234, the certificate can be authenticated against the CRL data at the remote server 116. At 238 the transaction can be either approved or rejected in accordance with the authentication at 234 and at 242 the approval or rejection can be confirmed with the user terminal 104. Those skilled in the art will recognize that many other message flows are possible with the message flow 200 if FIG. 2 being intended as exemplary of a simple use of a digital certificate and a Certificate Revocation List.

With reference to FIG. 3 the Certificate Authority 112 may generate the Certificate Revocation List in accordance with process 300. CRLs are generated at the Certificate Authority either on a periodic basis, or as a result of some event such as a certificate revocation, or some combination thereof. The process starts at 302 after which a database of certificates is queried for certificates meeting a particular criteria of inactivity. One example is for the query to request all certificates that have been revoked. Other certificates are assumed to still be valid and active.

At 304 the certificate database at the Certificate Authority responds to the query with certificates meeting the specified criteria. Header information is then generated, for example, in accordance with X.509 and RFC 2459 standards (or other applicable CRL standards) at 312 and at 316 the certificate is formatted (for example, as an ASN.1 or other format CRL.) The digital certificate is signed at 320 to assure its authenticity and is then stored at 322 within a computer residing at the Certificate Authority. The process returns at 326. Whenever a request is made for a new digital certificate, process 300 is carried out or, in some instances, the most recently generated CRL may be retrieved and forwarded to the requester.

As digital certificates find wider use, the number of such certificates issued has increased dramatically. With this increase comes an associated increase in the number of entries in a Certificate Revocation List. Accordingly, the process 300 as just described can become an extremely time consuming process that can result in the CRL being untimely in that many minutes or even hours can pass before an updated CRL can be generated. This is obviously undesirable since the process of authentication using the CRL should preferably be carried out on the most recent information available.

In addition to the certificate revocation list just described, certificate authorities commonly generate a certificate revocation list that is referred to as a delta CRL or ΔCRL. A delta CRL is simply a type of CRL that reflects changes made between two consecutive CRLs. Delta CLRs can be generated, for example, using process 300 wherein the query of 304 is a query that further limits the selection criterion to digital certificates that have been changed since the most recently generated CRL (or between two adjacent CRLs).

The concept of delta CRLs is illustrated in FIG. 4 by a sequence of CRLs numbered 1, 2, 3 and 4 with delta CRLs (504, 506 and 508) spanning CRL #1 and CRL #2, CRL #2 and CRL #3, and CRL #3 and CRL #4. With reference to FIG. 2, when a delta CRL is sent at 230, one portion of the processing of the delta CRL at 232 is to retain the data from the most recent CRL while appending the appropriate delta CRL to the existing CRL to update the list of revoked certificates.

SUMMARY OF THE INVENTION

The present invention relates generally to digital certificates and CRLs. Objects, advantages and features of the invention will become apparent to those skilled in the art upon consideration of the following detailed description of the invention.

In one embodiment of the present invention a method and apparatus for producing an enhanced CRL is provided. In response to a request containing an identifier of the most recently owned CRL stored by the requester, a certificate authority generates a CRL spanning from the most recently owned CRL to the current CRL. This CRL is formatted as a delta CRL and transmitted as a reply to the requester. This has the advantage of not requiring transmission of the full CRL even though more than one generation of CRL has occurred since the most recently owned CRL by the requester.

A method of creating a digital certificate revocation list (CRL) consistent with an embodiment of the present invention includes determining a latest owned CRL stored by a CRL recipient; creating a delta CRL comprising a list of digital certificates with a status of satisfying at least one inactive criterion, wherein said status has changed since the latest owned CRL; and sending the delta CRL to the CRL recipient.

A method of creating a digital certificate revocation list (CRL) consistent with another embodiment of the invention includes receiving a request for a CRL, the request including an indication of a latest owned CRL; creating a delta CRL comprising a list of digital certificates satisfying at least one inactive criterion since the latest owned CRL; and sending the delta CRL as a reply to the request.

A data structure, stored on a computer readable storage medium or transported over an electronic communication medium, for a digital certificate revocation list (CRL) consistent with an embodiment of the invention includes a list of digital certificates representing changes to a CRL that have occurred since generation of at least two additional CRLs. The CRL includes a CRL identifier wherein the CRL is formatted as a delta CRL.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
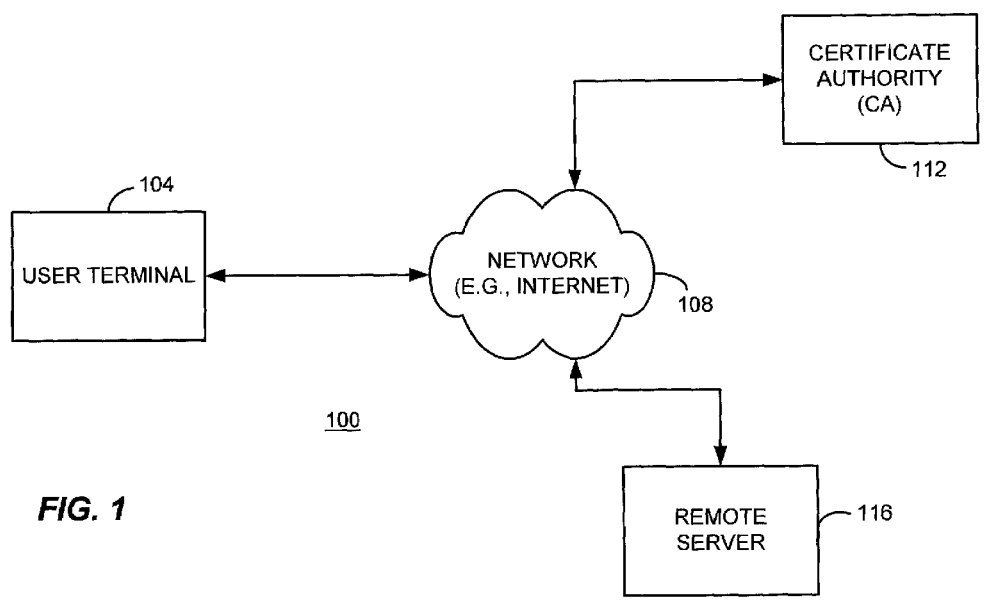
FIG. 1 illustrates a simple exemplary system using digital certificates.

In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "querying" or "formatting" or "merging" or "determining" or "receiving" or "requesting" or "signing" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Delta CRL Enhancement in Accordance with the Invention

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

Figure 5:
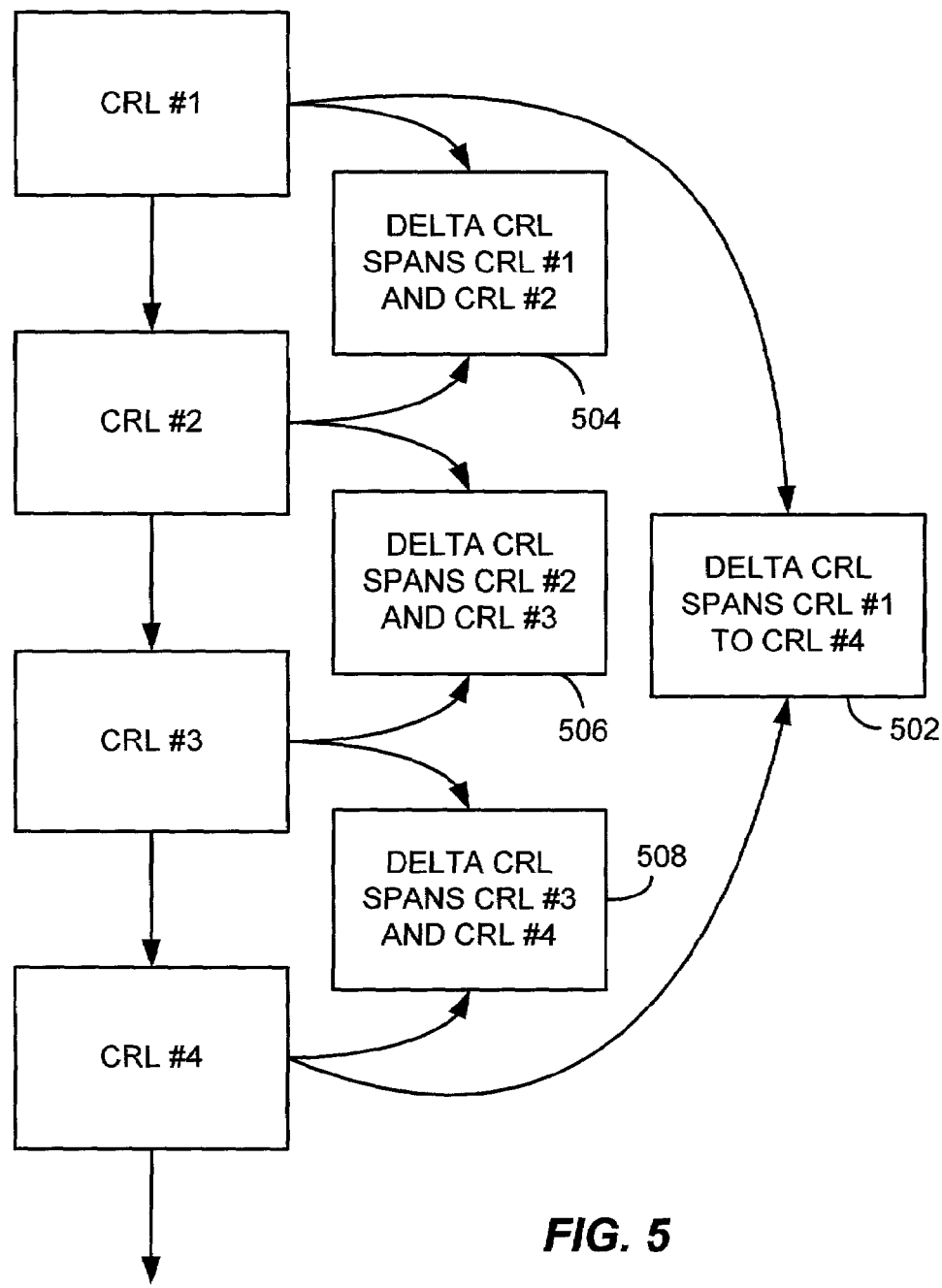
FIG. 5 illustrates the generation of delta CRLs spanning multiple delta CRLs.

As great numbers of digital certificates are issued and revoked, a particular CRL can become extremely lengthy and therefore require substantial amounts of time to transmit, receive and process. The present invention addresses this problem by permitting the generation of a delta CRL that spans multiple generations of CRLs. This is illustrated in FIG. 5 wherein, at the request of a requester, a delta CRL can be generated to span multiple CRLs. In this example, a delta CRL 502 is generated to span from CRL #1 to CRL #4. Thus, delta CRL 502 contains the certificate revocation list entries of delta CRL 504, delta CRL 506 and delta CRL 508.

Figure 2:
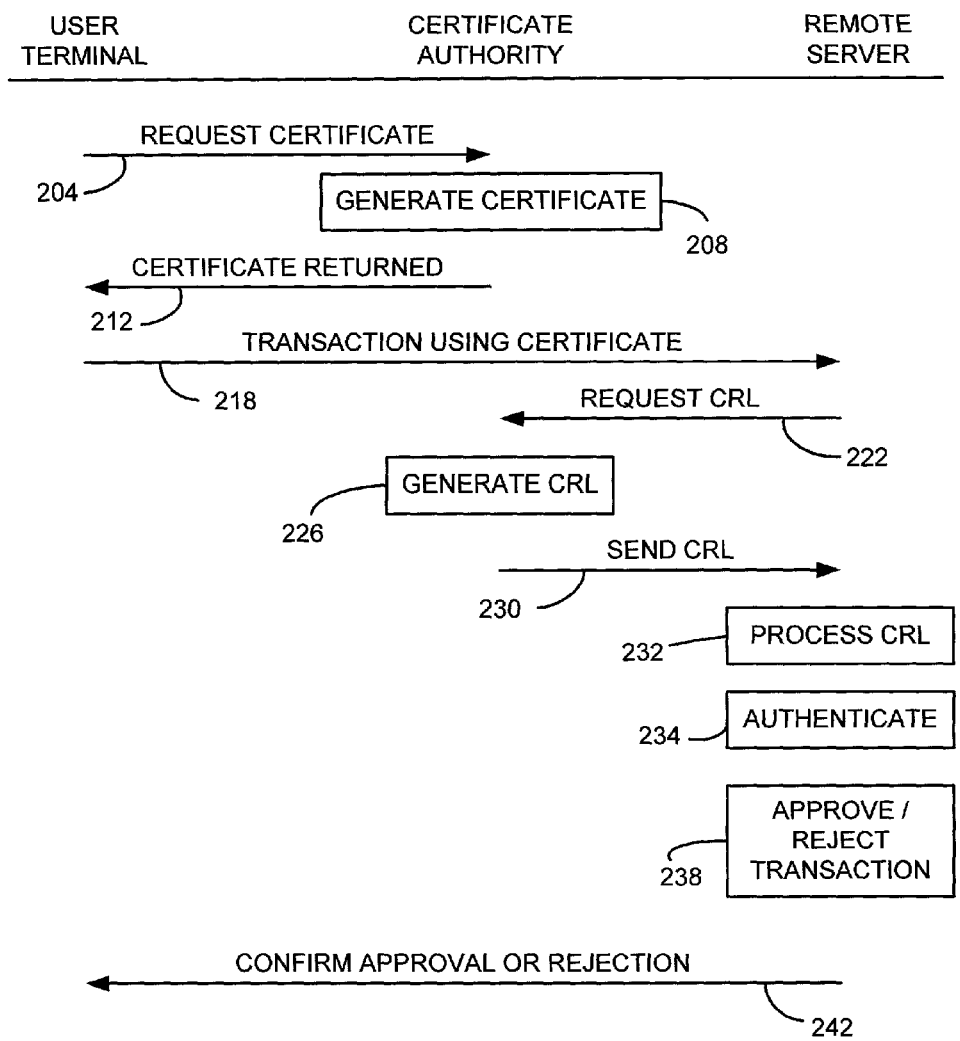
FIG. 2 is a signal flow diagram describing one use of a digital certificate and certificate revocation list in the system of FIG. 1.
Figure 3:
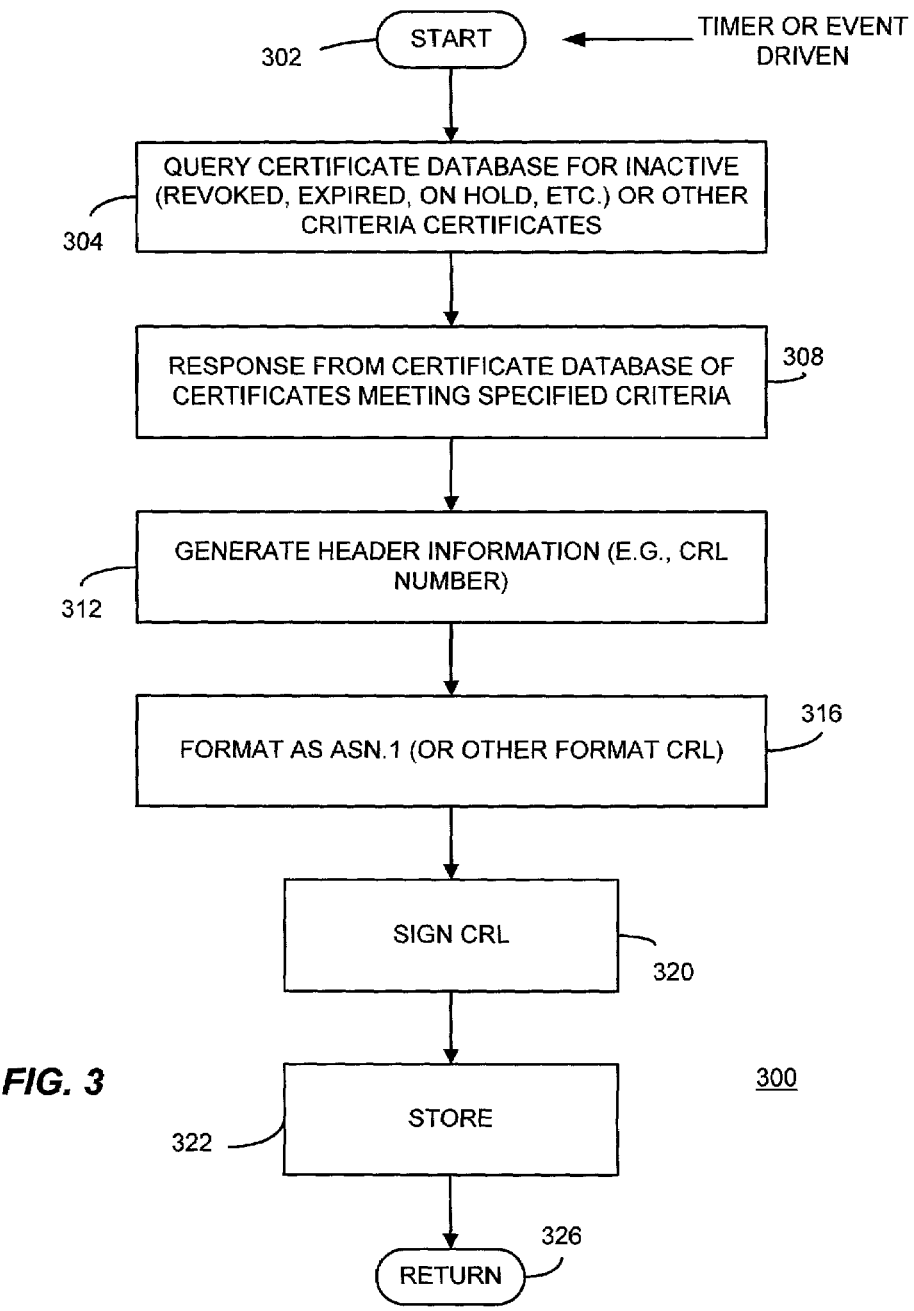
FIG. 3 is a flow chart describing generation of a CRL.
Figure 4:
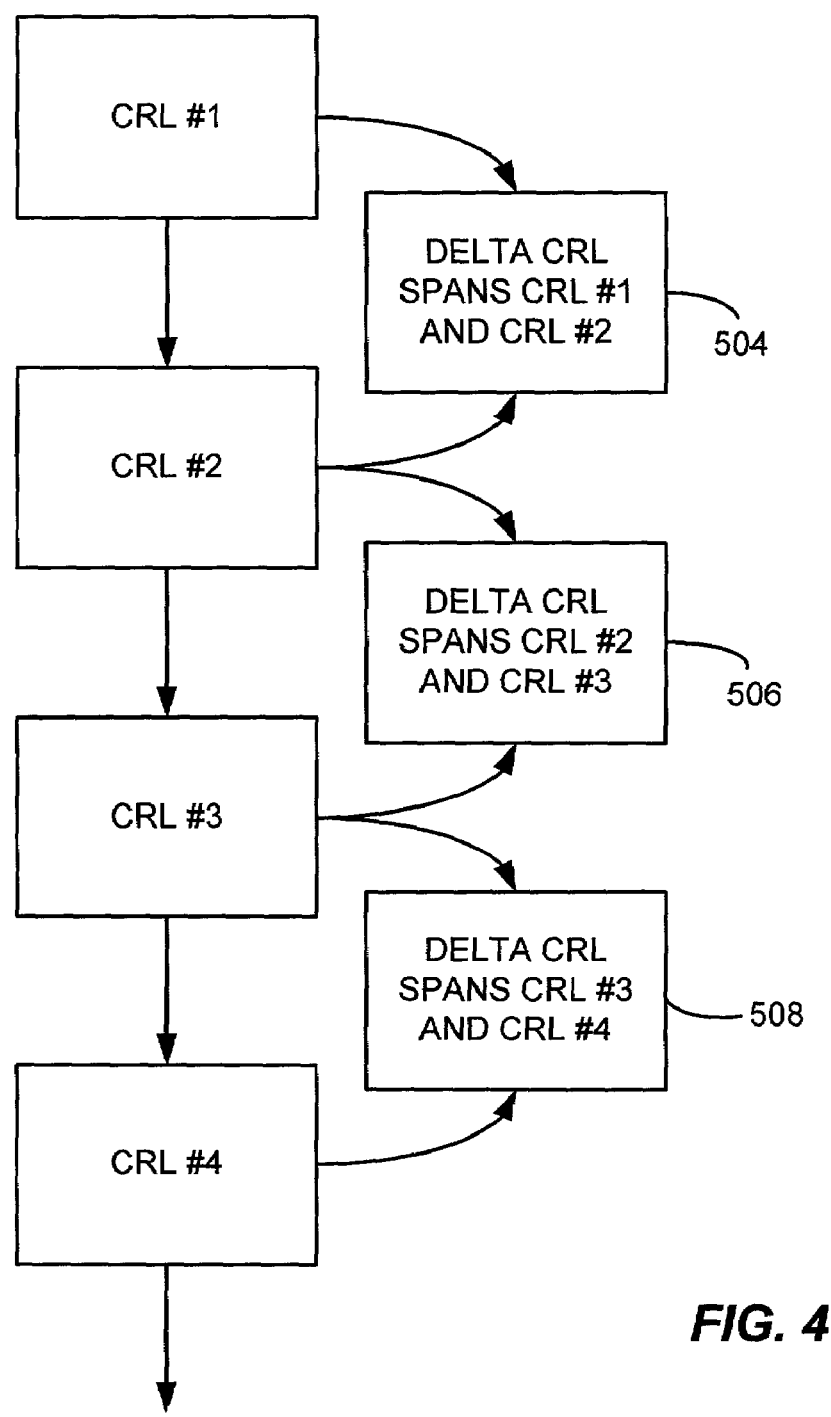
FIG. 4 illustrates the generation of delta CRLs.
Figure 6:
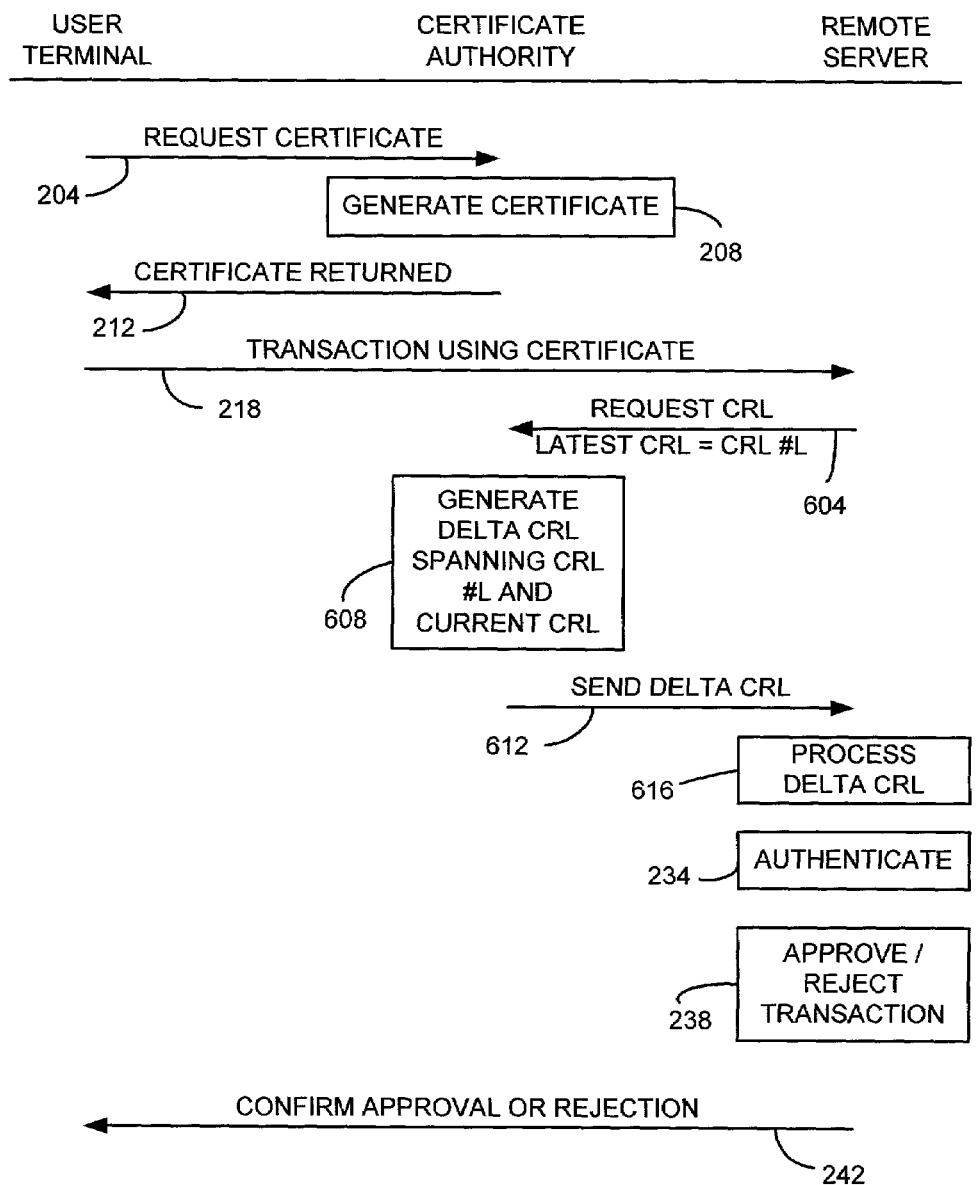
FIG. 6 is a signal flow diagram describing use of a delta CRL spanning multiple delta CRLs.

Delta CRL 502 can be created using any number of techniques including simply appending the data from delta CRL 504, 506 and 508 together or by querying a database of digital certificate information for all changes in the certificate revocation list occurring between CRL #4 and CRL #1. The overall process is illustrated by the message flow diagram 600 of FIG. 6. This diagram is similar to message flow diagram 200 of FIG. 2 until the point where the remote server requests a CRL of the certification authority. When this occurs at 604 of message flow 600, the CRL request includes the number (or other identifier) of the latest CRL owned (stored) by remote server 116. This CRL is designated CRL #L. When the request is received at the certificate authority, a delta CRL is generated that spans CRL #L to the current CRL at 608. This delta CRL is then returned to the remote server at 612 and the remote server processes the delta CRL at 616 by appending its entries to the currently owned CRL #L. This can be literally interpreted to create a new CRL or the data from the delta CRL can simply be appended to the data from CRL #L and used for whatever purpose the CRL is being used for at remote server 116. Once the processing is complete at 516, the remote server now owns an equivalent of the most recent CRL.

Figures 7, 8:
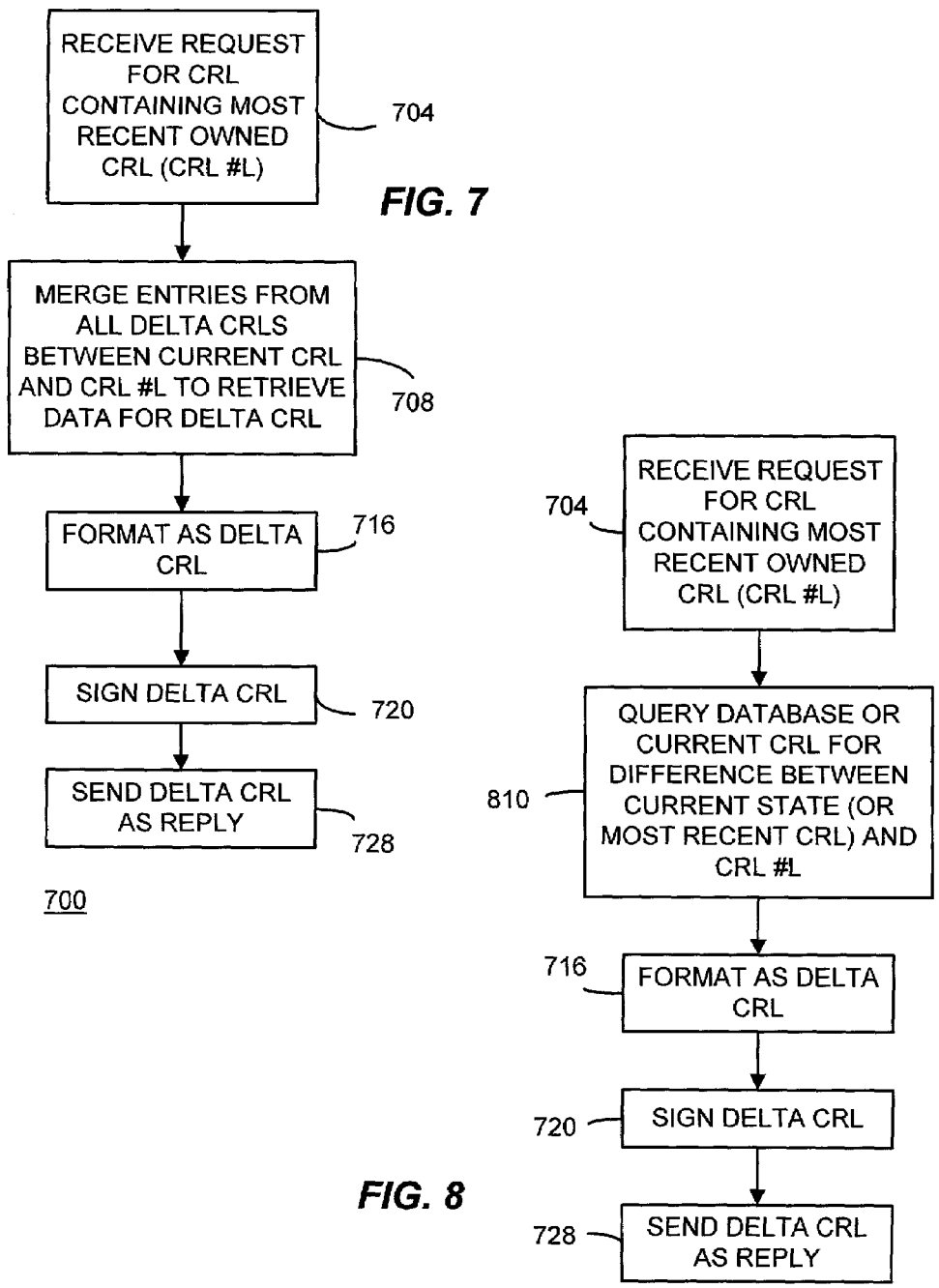
FIG. 7 is a flow chart describing one method consistent with an embodiment of the present invention for generation of a delta CRL spanning multiple delta CRLs.
FIG. 8 is a flow chart describing another method consistent with an embodiment of the present invention for generation of a delta CRL spanning multiple delta CRLs.

FIG. 7 depicts a process 700 for creation of the delta CRL in accord with the present invention. At 704 the certificate authority or other entity generating the CRL receives a request for a CRL containing the most recent owned CRL (CRL #L). At 708, entries are merged from all delta CRLs between the current CRL and CRL #L to retrieve the data necessary for creation of the delta CRL. This data is then formatted as a delta CRL at 716, signed with a digital signature at 720 and sent to the requester as a reply at 728.

In an alternative embodiment, depicted as process 800 of FIG. 8, when a request is received for a CRL, the request containing the most recently owned CRL (CRL #L), a certificate database is queried for the changes taking place between the current state and the state of the most recent CRL at 810. Or, the current CRL (i.e., the most recently generated CRL) itself can be queried to obtain differences between it and CRL #L. This information is then formatted as a delta CRL at 716, signed with a digital signature at 720 and sent as a reply at 728.

In this manner, the delta CRL created in accordance with the present invention can be sent as a reply in lieu of sending a complete copy of the most recent CRL which may be much larger in size than the size of several conventional delta CRLs. Thus, transmission timesaving can be achieved as well as processing timesaving.

Figure 9:
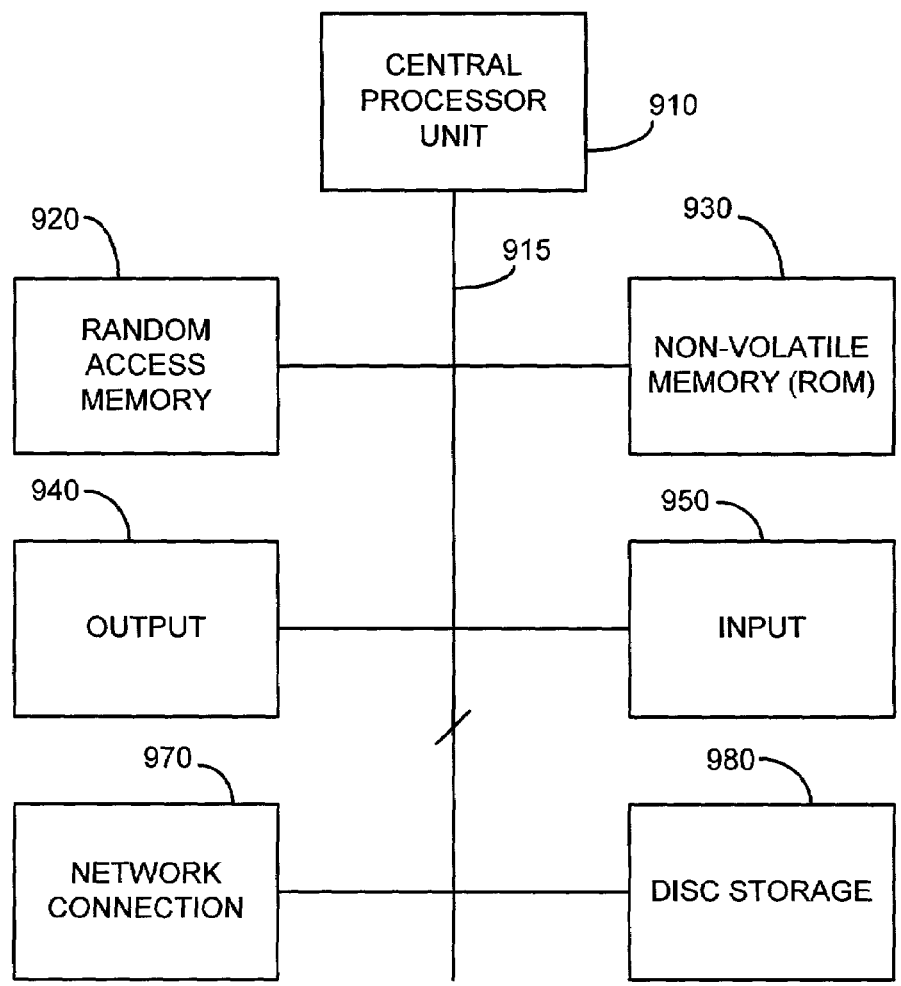
FIG. 9 illustrates a computer system suitable for use in conjunction with embodiments of the present invention.

The processes previously described as carried out on a computer system, for example, a computer system residing at the certificate authority 112. Such a computer system is depicted in FIG. 9 as 900. Computer system 900 includes a central processor unit (CPU) 910 with an associated bus 915 used to connect the central processor unit 910 to Random Access Memory 920 and Non-Volatile Memory 930 in a known manner. An output mechanism at 940 may be provided in order to display or print output for the computer administrator. Similarly, input devices such as keyboard and mouse 950 may be provided for the input of information from the computer administrator. Computer 900 also may include disc storage 960 for storing large amounts of information such as the list of certificates issued and the most recent Certificate Revocation List as well as any Certificate Revocation List cache and other information as required. Computer system 900 is coupled to the network (e.g., the Internet) using a network connection 970 such as an Ethernet adapter coupling computer system 900 through a fire wall and/or locally a network to the Internet.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, micro-controllers, optical computers, analog computers, dedicated processors and/or dedicated hard wired logic may be used to construct alternative equivalent embodiments of the present invention.

Those skilled in the art will appreciate that the program steps used to implement the embodiments described above can be implemented using disc storage as well as other forms of storage including Read Only Memory (ROM) devices, Random Access Memory (RAM) devices; optical storage elements, magnetic storage elements, magneto-optical storage elements, flash memory, core memory and/or other equivalent storage technologies without departing from the present invention. Such alternative storage devices should be considered equivalents.

The present invention is preferably implemented using a programmed processor executing programming instructions that are broadly described above in flow chart form, and that can be stored in any suitable electronic storage medium or that can be transmitted over any electronic communication medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A method of creating a digital certificate revocation list (CRL), comprising:
  determining a latest owned CRL stored by a CRL recipient;
  creating a plurality of delta CRLs at a sender from at least three generations of CRLs comprising the latest owned CRL and a current CRL, wherein the plurality of delta CRLs comprise a list of digital certificates with a status of satisfying at least one inactive criterion, wherein said status has changed since the latest owned CRL, wherein each of the plurality of delta CRLs span two consecutive generations of CRLs of the at least three generations of CRLs;

merging the plurality of delta CRLs by the sender to create a single merged delta CRL; and sending the single merged delta CRL by the sender to the CRL recipient after merging the plurality of delta CRLs.

2. The method according to claim 1, further comprising receiving a request for a CRL, the request including an indication of the latest owned CRL, and wherein the latest owned CRL is determined by examining the request.

3. The method according to claim 1, further comprising formatting the delta CRL as an ASN.1 format delta CRL.

4. The method according to claim 1, wherein the creating comprises comparing entries in the latest owned CRL with a current CRL.

5. The method according to claim 1, wherein the creating comprises querying a database for entries spanning the latest owned CRL and a current CRL.

6. The method according to claim 1, further comprising applying a digital signature to the CRL.

7. An electronic storage medium storing instructions which when executed on a programmed processor carry out the method of creating a digital certificate revocation list according to claim 1.

8. A method of creating a digital certificate revocation list (CRL), comprising:

receiving a request for a CRL, the request including an indication of a latest owned CRL stored by a CRL recipient;

creating a plurality of delta CRLs at a sender from at least three generations of CRLs comprising the latest owned CRL and a current CRL, wherein the plurality of delta CRLs comprise a list of digital certificates with a status of satisfying at least one inactive criterion, wherein said status has changed since the latest owned CRL, wherein each of the plurality of delta CRLs span two consecutive generations of CRLs of the at least three generations of CRLs;

merging the plurality of delta CRLs by the sender to create a single merged delta CRL; and sending the single merged delta CRL by the sender to the CRL recipient after merging the plurality of delta CRLs.

9. The method according to claim 8, further comprising formatting the delta CRL as an ASN.1 format delta CRL.

10. The method according to claim 8, wherein the creating comprises comparing entries in the latest owned CRL with a current CRL.

11. The method according to claim 8, wherein the creating comprises querying a database for entries spanning the latest owned CRL and a current CRL.

12. The method according to claim 8, further comprising applying a digital signature to the CRL.

13. An electronic storage medium storing instructions which when executed on a programmed processor carry out the method of creating a digital certificate revocation list according to claim 8.

14. The method according to claim 8, wherein the sending comprises transmitting the CRL as a reply over an electronic communication medium.

* * * * *